O. W. WILLCOX & L. F. LEMP.
STORAGE TANK.
APPLICATION FILED SEPT. 16, 1913.
1,121,057.
Patented Dec. 15, 1914.
3 SHEETS—SHEET 2.
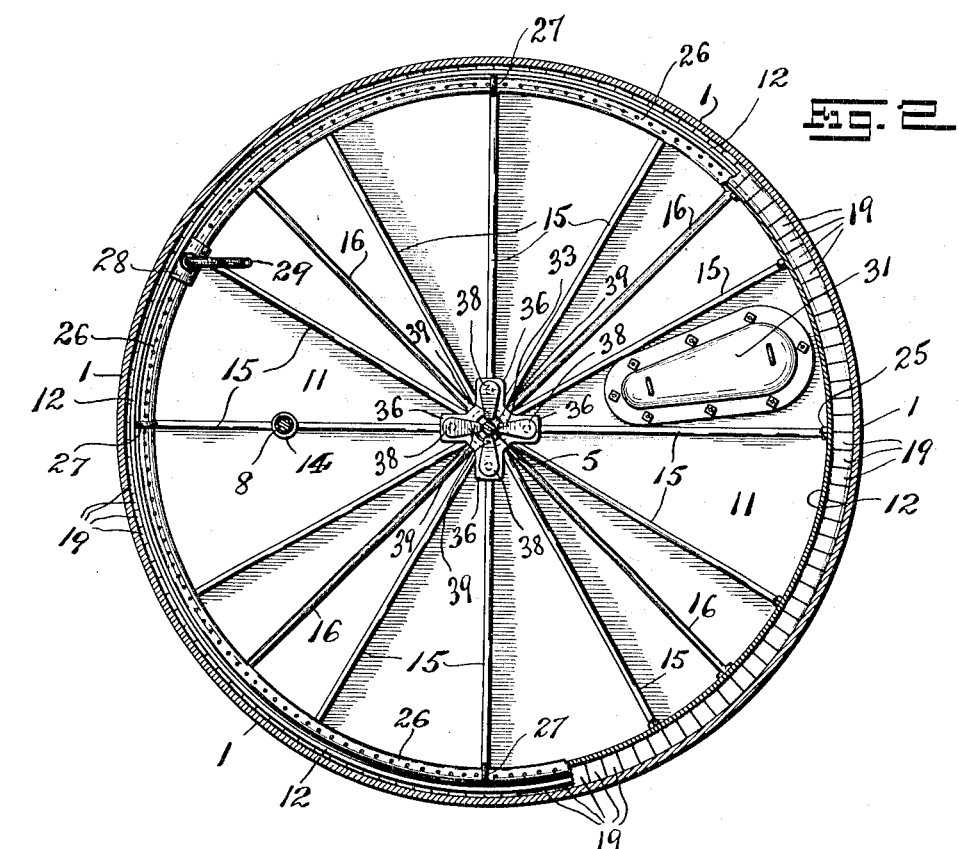
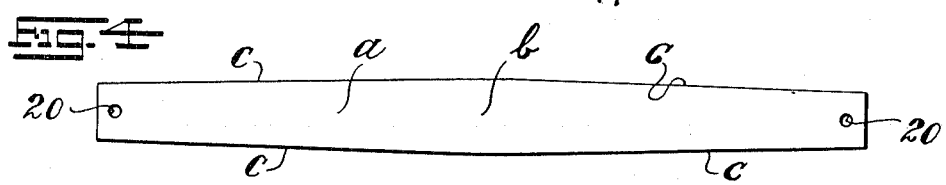
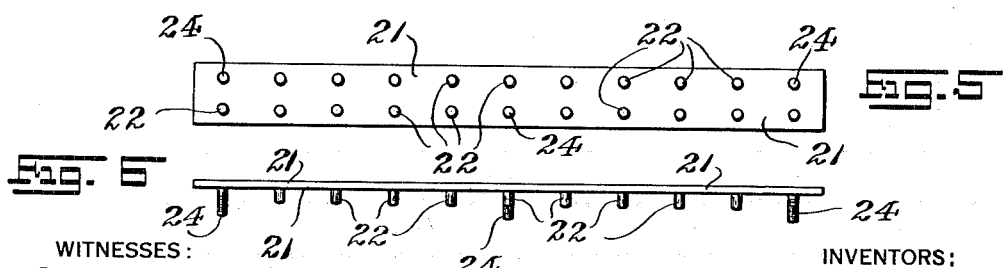
WITNESSES:
Fredk H. W. Frantzel
Clayton S. Cadmus
INVENTORS:
Oswin W. Willcox and Louis F. Lemp,
BY
Frantzel & Richards,
ATTORNEYS O. W. WILLCOX & L. F. LEMP.
STORAGE TANK.
APPLICATION FILED SEPT. 16, 1913.
1,121,057.
Patented Dec. 15, 1914.
3 SHEETS—SHEET 3.
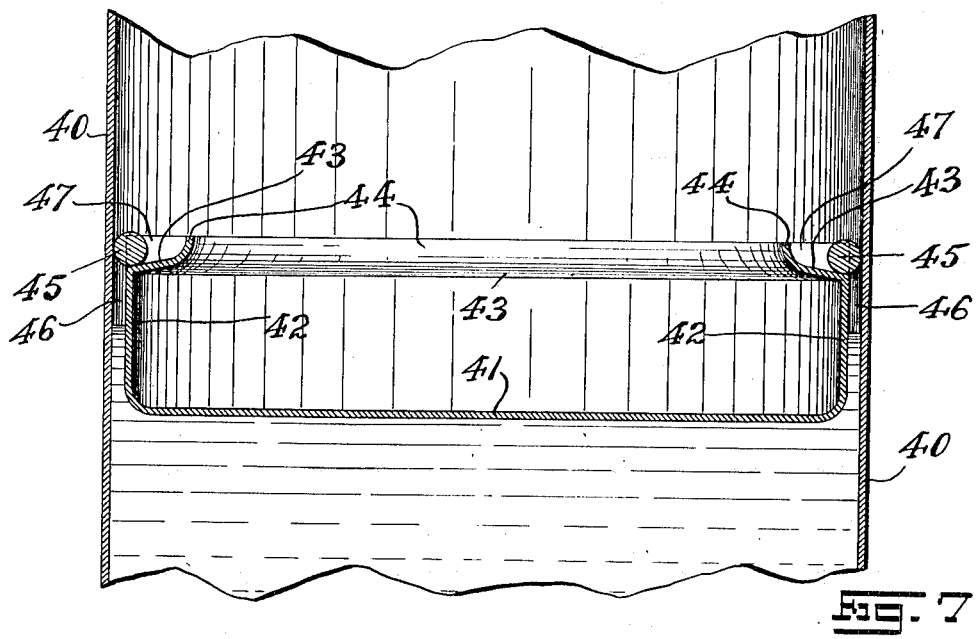
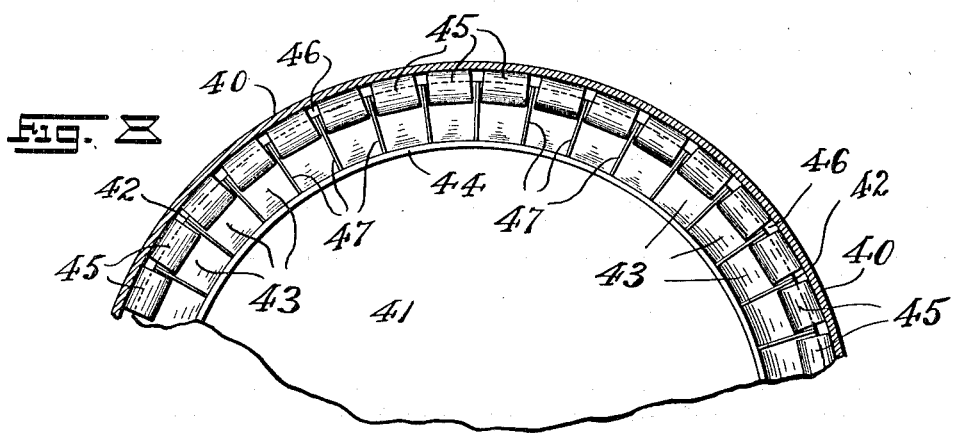
WITNESSES:
INVENTORS:
Oswin W. Willcox and Louis F. Lemp,
BY
ATTORNEYS

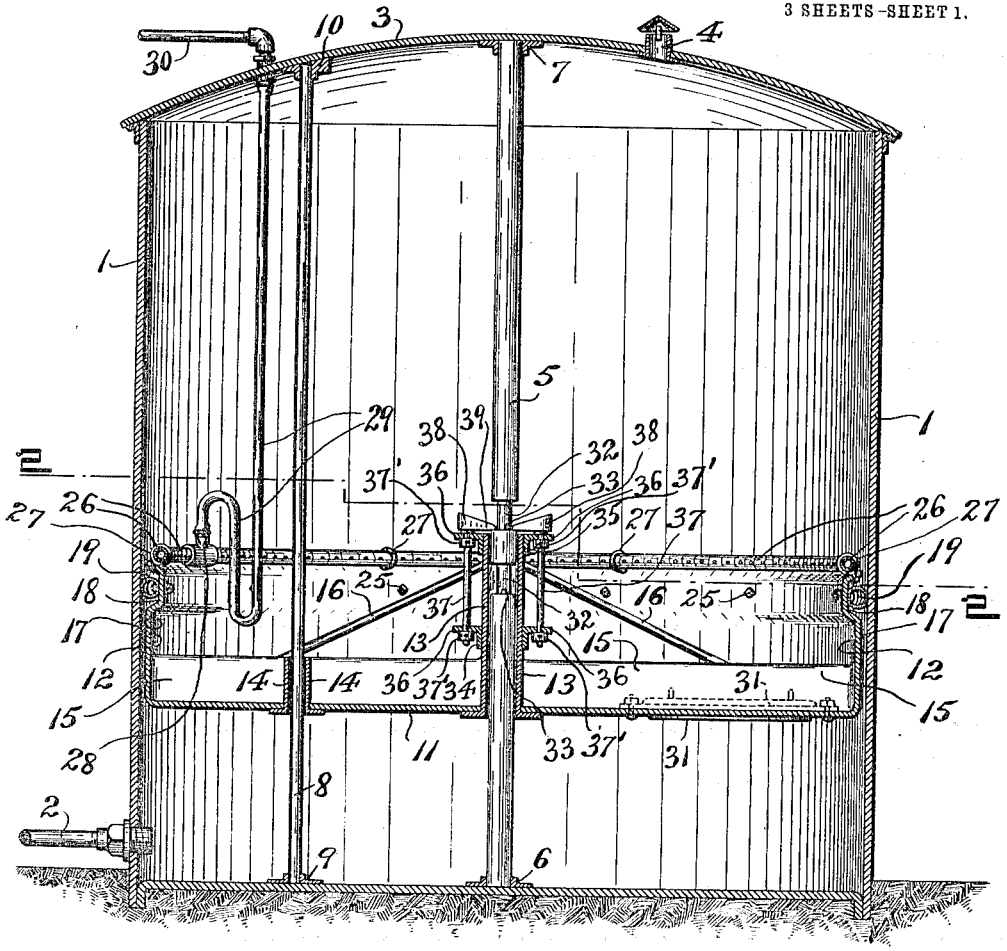
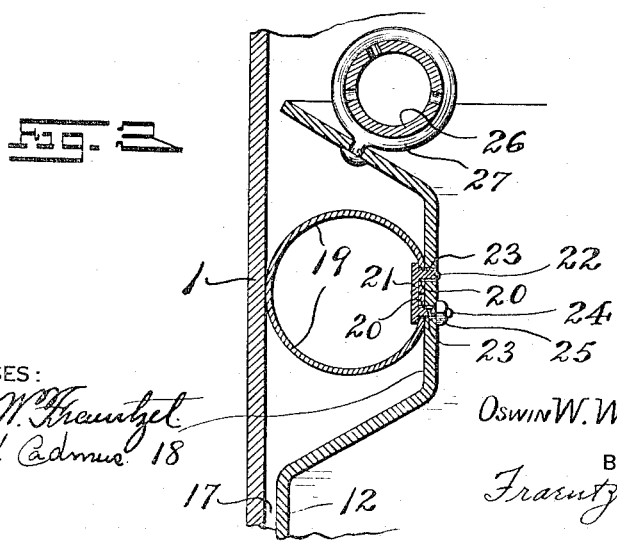

UNITED STATES PATENT OFFICE.

OSWIN W. WILLCOX, OF DOVER, NEW JERSEY, AND LOUIS F. LEMP, OF NEW YORK, N. Y.

STORAGE-TANK.

1,121,057.  Specification of Letters Patent.  Patented Dec. 15, 1914.

Application filed September 16, 1913. Serial No. 789,979.

*To all whom it may concern:*

Be it known that we, OSWIN W. WILLCOX, a citizen of the United States, residing at Dover, in the county of Morris and State of New Jersey, and LOUIS F. LEMP, a citizen of the United States, residing at New York, in the county of New York and State of New York, have invented certain new and useful Improvements in Storage-Tanks; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in storage tanks for inflammable liquids; and the invention has reference, more particularly, to a novel construction of floating cover and accessories for storage tanks containing inflammable liquids.

Under the present methods of storing crude petroleum as it issues from the oil wells, and products of similar nature, there is always present the danger of explosion and fire, due to the fact that the crude petroleum contains not only high-boiling or non-boiling constituents, such as paraffin, asphalt, and lubricating oils, but also substances like gasolene, naphtha, petroleum, ether, and other substances which have boiling points at or very near the ordinary temperature of the air. These lighter substances, on account of their volatile nature, have a tendency to evaporate from the body of the mass, and their vapor, when mingled with a sufficient quantity of air, forms a highly inflammable and explosive mixture. When such a mixture has accumulated in a crude oil tank, any flame or flash of lightning striking the tank will ignite it, with the result that the top of the tank, if tank is provided therewith, will be blown off and the oil will take fire, resulting in the destruction of property, and possibly in loss of life. Lightning is regarded as especially dangerous to such tanks, and it is regarded as almost certain that when an oil tank is struck by lightning an explosion or at least a fire will result.

It is the object of the present invention to provide an oil storage tank with suitable accessories whereby the ignition of the contents by lightning or other causes is rendered practically impossible, and to generally minimize the well known dangers and risks involved in the storage of crude petroleum and inflammable substances of a similar nature. This we accomplish by providing the tank with a floating cover having new and improved accessories so that the amount of inflammable material evolved from the body of the material stored therein is reduced to the lowest possible amount, and by providing means whereby the very small amount of inflammable material which must necessarily be allowed to escape may be rendered harmless, in case of an eventual ignition, or so diluted with such a preponderance of air or of inert gas that an ignition becomes impossible—all of which will be more fully set forth in the following specification.

Other objects of this invention not at this time more particularly mentioned will be clearly understood from the following detailed description of the invention.

The invention consists, primarily, in the novel floating cover and accessories for storage tanks hereinafter more fully set forth; and, furthermore, this invention consists in the various arrangements and combinations of the several devices and parts, as well as in the details of the construction of the same, all of which will be more fully described in the following specification and then embodied in the clauses of the claims which are appended to and which form an essential part of this specification.

The invention is clearly illustrated in the accompanying drawings, in which:—

Figure 1 is a vertical longitudinal section of a storage tank equipped with the novel construction of floating cover made according to and embodying the principles of the present invention; Fig. 2 is a horizontal section of the same taken on line 2—2 in said Fig. 1 looking downward; Fig. 3 is a detail vertical section showing the means employed for closing the annular space between the periphery of the floating cover and the walls of the tank; Fig. 4 is a plan view of a blank from which said annular space closing members are formed; Fig. 5 is a plan view of a keeper-plate for securing said annular space closing members to said floating cover; and Fig. 6 is an edge view of said keeper-plate. Fig. 7 is a detail vertical longitudinal section of a portion of a storage tank equipped with a slightly modified construction of floating cover and annular space closing members; and Fig. 8 is a detail horizontal section of the same.

Similar characters of reference are employed in all of the above described views to indicate corresponding parts.

Referring now to the said drawings, the reference character 1 indicates a tank of any suitable construction and preferably of a cylindrical form, the same being equipped with a suitable outlet-pipe 2 through which its contents may be withdrawn as desired. It is preferable to provide the said tank 1 with a suitable covering or top 3, the same being provided with an air-vent 4. Centrally disposed within said tank 1, so as to stand upright therein, is a suitable guide-post or standard 5, the same being supported in the socket-pieces 6 and 7 which are respectively secured to the bottom and the under side of the covering or top 3 of the tank. Also suitably disposed within said tank, so as to stand upright therein and parallel to said guide-post or standard 5 is a guide-rod 8, the same being supported in the socket-pieces 9 and 10, which are respectively secured to the bottom and the under side of the covering or top 3 of the tank.

The reference character 11 indicates the body of the novel floating cover, which is made according to and embodies the principles of the present invention. The said body 11 is provided at its periphery with an upwardly extending annular flange 12. Connected with said body 11 is a centrally disposed upwardly extending tubular-member 13 which provides a guide-member adapted to be slidably disposed upon said guide-post or standard 5, so as to maintain the cover-member centrally disposed within the tank, yet free to move up and down as the supporting level of the fluid contained therein varies. Said body 11 is further provided with another suitably disposed upwardly extending tubular-member 14 which provides a guide-member adapted to be slidably disposed upon said guide-rod 8, whereby said cover is further guided in its up and down movements and at the same time retained against turning or rotating on said guide-post or standard 5. Radiating from said tubular-member 13 to the flange 12 are a plurality of vertical walls or rib-members 15, which, being secured in any suitable manner to the surface of said body 11, tend to strengthen the same, and thereby prevent any buckling or collapsing of the floating-cover. As an additional strengthening means there are also provided a plurality of stay-rods 16, which are preferably secured adjacent to the upper end of said tubular-member 13 so as to incline downwardly toward said body 11 of the floating-cover, to which the opposite ends thereof are suitably secured. When the cover is thus mounted it is free to move up and down within the tank since it floats upon the surface of the fluid contained in said tank and moves in accordance with every variation of the level of said fluid within the tank. In this manner the floating cover protects the greater portion of the surface of the fluid contained in the tank against contact with air, thus preventing to a great extent the evaporation or volatilization of the fluid and the consequent formation and collection of combustible or otherwise dangerous gas in the upper end of the tank above the fluid level. While the cover thus protects the greater portion of the surface of the fluid, there necessarily exists, however, between the walls of the tank and the circumferential boundary of the cover a small annular space 17 which, unless closed or diminished, would permit of some air reaching the surface of the fluid immediately exposed in said space, and consequently would permit some evaporation of the fluid and some gas formation. It is one of the essential objects of this invention to close as tightly as possible this space 17, in such a manner, however, as not to interfere with or prevent the proper up and down movement of the cover as caused by the changing of the level of the fluid upon which said cover floats. To this end the upper marginal edge of said flange 12 is depressed to form an outwardly facing annular channel or groove 18. Mounted in this channel are a plurality of outwardly projecting resilient closing-members 19, the same being preferably made of flat spring steel strips $a$, such as is illustrated in Fig. 4 of the drawings. The said strips $a$ are widened at a point midway between their ends, as at $b$, so that their side edges $c$ taper from said widened portion toward each end. Each end of the strip is provided with a suitably disposed hole or perforation 20. The strips thus constructed are bent into ring-shape with their free ends abutting, thus forming the resilient closing-members 19. When assembled side by side the resilient closing-members extend around the cover so that the side edges thereof will abut or register together on account of tapering edges $c$, which are necessary because of the radially disposed position of said closing-members with relation to the cover. Of course various means may be provided to secure said plurality of closing-members 19 in their assembled relation with each other and with the floating cover, but we have selected as a practical fastening means the keeper-plates 21, which may be made in suitable lengths. These keeper-plates 21 are provided with a plurality of properly positioned pairs of outwardly projecting studs 22. When the keeper-plates 21 are assembled with the resilient closing-members 19, the upper row of studs 22 pass through the perforations or holes 20 in the upper disposed ends of the closing-members 19, and the lower row of studs 22 pass through the perforations or holes 20 in the lower disposed ends of the closing members 19, thus connecting the said closing-members in their ring-shaped outwardly projecting positions. The rear-wall of said channel or groove 18 is preferably provided with perforations or holes 23 in which the free ends of the studs 22 are received. Each keeper-plate 21 is provided with suitably disposed elongated screw-threaded studs 24 which extend through the rear wall of said channel or groove 18 so as to receive retaining nuts 25 by means of which said keeper-plates 21 and the closing-members 19 assembled therewith, are fastened in secured relation to said cover. The said closing-members 19 rest tangent with the inner surface of the walls of the tank 1, and being thus disposed between the flange 12 of the cover and said walls of the tank thereby closes over the annular space 17. The plurality of resilient closing-members 19 are individually yieldable so that when any one of them meets with any unevenness in the surface of the tank wall, such as rivets or the joints of plates from which the tank may be constructed, they will yield to the same, and pass thereover, and then again contact with the wall of the tank without interfering with or preventing the free vertical movement of the floating cover.

By means of the floating cover and its marginal closing-members 19 the evaporation of the volatile products of the oil or other fluid contained in the tank is practically prevented, thus obviating the danger of the collection and formation of gas, inflammable or otherwise, in the upper portion of the tank. Even though some small amount of gas may be formed and find its way through the joints or interstices between the closing-members 19 the amount will be so slight that it will be quickly diffused and diluted by contact with the proportionately great volume of air in the upper portion of the tank, so as to render the same little liable to ignition or explosion. But even though ignition or combustion of this gas should occur, we provide means for quickly suppressing and extinguishing the same. For this purpose we provide a circular perforated pipe or conduit 26 which is mounted on the upper marginal edge of said flange 12, so as to extend around the same adjacent to the mouth of said annular space 17, the same being secured or held firmly in position by means of suitable bracket-irons 27 which are riveted or otherwise secured to the marginal edge of said flange 12. The said perforated pipe or conduit 26 is provided with a T-fitting 28 to which is connected a flexible-pipe 29 which is arranged to be suspended from said top 3 of the tank 1, and which is there connected with a supply-pipe 30. By thus arranging said perforated-pipe or conduit 26, the same is caused to move with said floating-cover, and when desired steam or another inert gas may be passed through the same from a suitable source of supply, said steam passing through the perforations and thus forming a curtain flowing across the mouth of the annular space 17, thereby cutting off the gas which may seek to arise therethrough, and extinguishing the same, if, by any chance, it should become ignited.

It sometimes happens that it is very desirable to clean out the accumulated deposits in the bottom of a crude petroleum tank, or a tank containing other substances, and for this reason it is desirable to have an arrangement whereby the vertically movable floating cover may be suspended in a stationary position so that the workmen may get beneath it. To this end we provide our floating cover with a man-hole provided with a removable man-hole plate or cover 31, which when removed permits the workmen to descend into the tank through the floating cover; and for suspending the floating cover we provide in the guide-post or standard 5, at a suitable position, portions of reduced diameter 32 which provide shoulders 33. Connected with the tubular-member 13 of the floating cover are a pair of collars 34 and 35 each provided with a plurality of outwardly extending or projecting perforated bearing-lugs 36, in which are rotatably mounted vertical shafts or rods 37, collars 37' being secured upon said shafts or rods 37 to prevent their withdrawal from said bearing-lugs. Secured to the upper end of each vertical shaft or rod 37 is a latch or suspending member 38 provided with a nosing 39. When the cover is positioned at the right elevation the said latch or suspending members 38 are rotated to turn their nosings 39 upon one of the shoulders 33 of said guide-post or standard 5, so that when the contents of the tank are withdrawn the cover no longer floats but remains suspended to the guide-post or standard 5, so that when the tank is empty the workmen may enter the same beneath said floating cover.

Referring now to Figs. 7 and 8 of the drawings we have illustrated therein a slightly modified means for closing the annular space between a floating cover and the walls of the tank, the same embodying, however, the essential principles of our present invention. In this construction the reference character 40 indicates a suitable tank adapted to contain crude petroleum or any other substance. Arranged within this tank is a floating-cover 41 having an upwardly extending annular flange or wall 42. Connected with the upper marginal edge of this wall or flange 42 is an inwardly extending and slightly upwardly inclined platform or shelf 43, the inner free edge of which is turned or curled upwardly as at 44. Disposed upon the said platform or shelf 43 are a plurality of cylindrical rolls 45, the same being free to move or roll down the inclination of said platform or shelf 43 and against the interior side of the wall of said tank, and thus being caused to project themselves over the annular space 46 between the annular flange or wall 42 of the cover 41 and the side or walls of the tank 40, and in that manner to close over the major portion of said annular space 46. The said rolls 45 being free to move will roll back upon the platform or shelf 43 when any obstruction upon the sides of the tank is met with, such, for example, as a rivet or the edge of a plate, and thus will not obstruct or block the free vertical movement of the cover as it floats upon the contents of the tank. We have found it desirable to insert vertical partition members 47 between the adjoining ends of said rolls, to thereby prevent displacement of the same from their properly correlated positions, and also serving to guide the same during their rolling movements.

From the above description it will be apparent that our present invention provides a novel, efficient and simple construction of tank and floating cover therefor, the same being adapted to afford efficient protection against the accumulation of gas within the tank, and also in its accessories providing efficient means for guarding against fire and the destruction of the contents of the tank thereby.

We are aware that some changes may be made in the various arrangements and combinations of the several devices and parts without departing from the scope of the present invention as set forth in the foregoing specification, and as defined in the clauses of the claims which are appended thereto. Hence, we do not limit our present invention to the exact arrangements and combinations of the several devices and parts as described in said specification, nor do we confine ourselves to the exact details of the construction of the said parts, as illustrated in the acompanying drawings.

We claim:—

1. The combination with a storage-tank of a floating-cover provided with an upwardly extending marginal flange provided with means for closing the space between the circumference of the cover and the walls of the tank, a vertically disposed guide-post within said tank, said guide-post having a reduced portion providing a shoulder, a tubular guide-member connected with said floating-cover and slidably disposed upon said guide-post, a removable man-hole plate connected with said floating-cover, and means connected with said floating-cover adapted to be moved into holding engagement with said shoulder of said guide-post to suspend said floating-cover thereon.

2. The combination with a storage-tank of a floating-cover provided with an upwardly extending marginal flange, a vertically disposed guide-post within said tank, said guide-post having a reduced portion providing a shoulder, a tubular guide-member connected with said floating-cover and slidably disposed upon said guide-post, a removable man-hole plate connected with said floating-cover, and means connected with said floating-cover adapted to be moved into holding engagement with said shoulder of said guide-post to suspend said floating-cover thereon, the same comprising a plurality of bearing portions secured to and extending outwardly from said tubular guide-member, vertical shafts journaled in said bearing-portions, latch-members secured to the upper ends of said shafts the same having nosings adapted to be turned in holding engagement with said shoulder of said guide-post, and collars secured upon said shafts to prevent the withdrawal of the same from said bearing portions.

In testimony, that we claim the invention set forth above we have hereunto set our hands this 10th day of September, 1913.

OSWIN W. WILLCOX.
LOUIS F. LEMP.

Witnesses:
LOUISE A. PHILLIPS,
FRED J. WHELAN.